(12) United States Patent
Hara et al.

(10) Patent No.: US 6,183,680 B1
(45) Date of Patent: Feb. 6, 2001

(54) PROCESS FOR PRODUCING MULTILAYER MOLDED ARTICLE

(75) Inventors: Takahisa Hara, Kawanishi; Masahito Matsumoto, Ibaraki; Nobuhiro Usui, Takatsuki; Sigeyoshi Mathubara, Osaka, all of (JP)

(73) Assignee: Sumitomo Chemical Company, Limited, Osaka (JP)

(*) Notice: Under 35 U.S.C. 154(b), the term of this patent shall be extended for 0 days.

(21) Appl. No.: 08/427,706

(22) Filed: Apr. 24, 1995

Related U.S. Application Data

(63) Continuation of application No. 07/836,233, filed on Feb. 18, 1992, now abandoned.

(30) Foreign Application Priority Data

Feb. 18, 1991 (JP) .................................................. 3-023528

(51) Int. Cl.⁷ .................................................. B29C 43/18
(52) U.S. Cl. .......................................... 264/163; 264/266
(58) Field of Search ................................ 264/266, 267, 264/275, 328.1, 328.7, 328.14, 138, 163, 259, 255, 265

(56) References Cited

U.S. PATENT DOCUMENTS

| 4,216,184 | * | 8/1980 | Thomas | 264/266 |
| 4,873,041 | * | 10/1989 | Masui et al. | 264/266 |
| 5,000,903 | * | 3/1991 | Matzinger et al. | 264/266 |
| 5,009,821 | * | 4/1991 | Weaver | 264/266 |
| 5,154,872 | * | 10/1992 | Masui et al. | 264/266 |
| 5,223,201 | * | 6/1993 | Masui et al. | 264/266 |
| 5,238,640 | * | 8/1993 | Masui et al. | 264/266 |

FOREIGN PATENT DOCUMENTS

| 833118 | 2/1952 | (DE) . | |
| 0333198 | 9/1989 | (EP) . | |
| 333198 | * 9/1989 | (EP) | 264/266 |
| 2329434 | 5/1977 | (FR) . | |
| 2364112 | 4/1978 | (FR) . | |
| 1143199 | * 2/1969 | (GB) . | |

* cited by examiner

Primary Examiner—Angela Ortiz
(74) Attorney, Agent, or Firm—Birch, Stewart, Kolasch & Birch LLP

(57) ABSTRACT

A multilayer molded article having a core layer and a skin material laminated on the core layer is produced by providing a skin material between a pair of upper and lower molds, supplying a thermoplastic resin melt between the skin material and one of the molds, closing the molds to press and form the resin melt while holding edges of the skin material with pins provided on a skin material-fixing frame which moves along an outer peripheral wall of one of the upper and lower molds, and cooling the molds and removing the multilayer molded article from the molds.

6 Claims, 3 Drawing Sheets

PROCESS FOR PRODUCING MULTILAYER MOLDED ARTICLE

This application is a continuation of application Ser. No. 07/836,233, filed on Feb. 18, 1992, now abandoned.

BACKGROUND OF THE INVENTION

1. Field of the Invention

The present invention relates to a process for producing a multilayer molded article which comprises a core layer of a thermoplastic resin and a skin material which is laminated on the core layer.

2. Description of the Related Art

A large number of plastic molded articles are used in many fields including the automobile and domestic electric appliance fields because of their low costs, free moldability and light weight. However, they have some drawbacks that they have poor appearance and cool feeling and they tend to be easily flawed. Then, it is highly desired to impart decoration and soft feeling to the plastic molded articles. Hitherto, many attempts have been made to provide a compound which satisfies such desires. But, it is difficult to produce a resin molded article having improved surface properties while maintaining the free moldability and strength from a single material, and at present, a multilayer molded article comprising a combination of plural materials which have different functions is generally used.

Many processes are known for the production of a multilayer molded article. For example, Japanese Patent Kokai Publication No. 13859/1976 discloses a process comprising preforming a skin material by, for example, thermoforming, placing the preformed skin material in a mold, supplying a core resin melt and then integrating the two together. This process requires many molding steps and much apparatus. In addition, since each apparatus and each molding method has its own technical problems, much work and expense are necessary to produce a final product.

As disclosed in Japanese Patent Publication No. 19132/1975, another process molds a multilayer molded article using a single mold having a vacuum molding function and core resin supplying means. But, this process is no better than the above process.

To overcome the drawbacks of the above two processes, Japanese Patent Kokai Publication No. 63461/1978 discloses a process comprising placing an unpreformed skin material in a mold and then integrating the skin material and the core resin. Though this process is economical, tension of the skin material is controlled only in one direction and not in other directions, the skin material tends to be wrinkled, so that this process can produce only a simple shape article but not a deep draw molded article.

As proposed in Japanese Patent Publication No. 24807/1988, a multilayer molded article can be produced by clamping edges of a skin material between a female mold and a skin material-fixing frame, preforming the skin material, supplying a melt of a thermoplastic resin as a core material and then molding the resin. However, this process is not necessarily satisfactory for molding a large size article, in particular, having a complicated shape.

SUMMARY OF THE INVENTION

One object of the present invention is to provide a process for producing a multilayer molded article, which process solves the problems of the conventional molding processes.

Another object of the present invention is to provide a process for producing a multilayer molded article having good appearance without wrinkles or breakage of the skin material.

A further object of the present invention is to provide a process for producing a multilayer molded article which process can simplify the production steps and produce the article economically.

According to the present invention, there is provided a process for producing a multilayer molded article comprising a core layer and a skin material laminated thereon, which process comprises the steps of:

providing a skin material between a pair of upper and lower molds, supplying a thermoplastic resin melt between said skin material and one of said molds, closing the molds to press and form said resin melt while holding edges of said skin material with pins provided on a skin material-fixing frame which moves along an outer peripheral wall of one of said upper and lower molds, and cooling said molds and removing said multilayer molded article from the molds.

DETAILED DESCRIPTION OF THE DRAWINGS

Figure 1A:
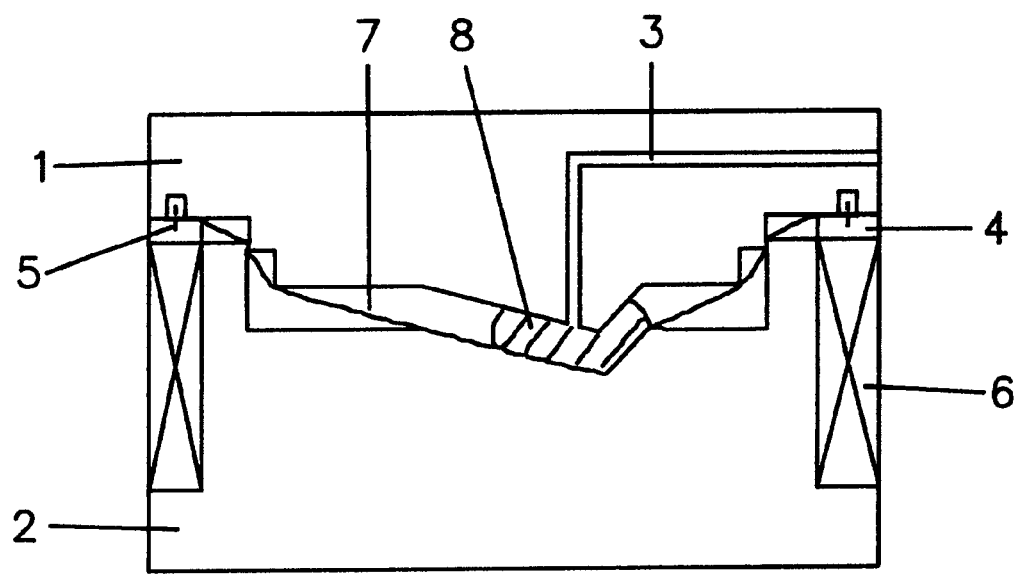
FIGS. 1A and 1B are vertical cross sectional views of an example of the molds used in the molding process of the present invention.

Examples of the skin material to be used in the process of the present invention are woven or nonwoven fabric, a sheet or film of a thermoplastic resin (e.g. polyolefin, polyvinyl chloride, polyamide, etc.) and a thermoplastic elastomer (e.g. polyolefin type, polyester type, polyurethane type and polyvinyl chloride type thermoplastic elastomers) and the like. These skin materials may be used independently or in a form of a laminate of two or more of them. Further, the skin material may be lined with a foam sheet of polypropylene, polyethylene or polyurethane to impart soft feeling, or with a fabric or a sheet to protect the skin material from heat of the thermoplastic resin melt or enhance adhesion between the skin material and the core layer. Before being placed in the mold, the skin material may be preheated in order to adjust its tensile stress or elongation.

As the thermoplastic resin used as the core layer material, any one of conventional thermoplastic resins which are used in compression molding, injection molding and extrusion molding can be used. Specific examples are thermoplastic resins (e.g. polypropylene, polyethylene, polystyrene, acrylonitrile-styrene-butadiene copolymer, polyamide, etc.) and thermoplastic elastomers (e.g. ethylene-propylene block copolymer, styrene-butadiene block copolymer, etc.).

The thermoplastic resin may contain at least one conventional additive, for example, a filler such as an inorganic filler and glass fiber; a pigment; a lubricant; and an antistatic agent.

In the process of the present invention, the skin material-fixing frame having pins is used, which frame moves along the peripheral wall of one of the upper and lower molds. The pins are provided on an upper or lower surface of the frame. Preferably, each pin has a diameter of 3 to 6 mm, and protrudes for a length of about 20 mm from the surface of the frame.

The skin material-fixing frame is provided around the upper or lower mold using expansion-contraction means such as a spring, an air cylinder, a hydraulic cylinder, etc. The skin material-fixing frame may be permanently or detachably connected to the expansion-contraction means. When the skin material-fixing frame is a detachable one, plural frames are used and, while one of them is used in the molding process, a skin material is set on another of the frames and immediately used in the next molding process, whereby a molding cycle is shortened.

The skin material may be set on the pins by piercing the skin material with the pins or by making small holes in the skin material at positions corresponding to the positions of the pins and passing each pin through the corresponding hole.

Then, the thermoplastic resin is press molded by closing the molds while holding the edges of the skin material with the pins to produce the multilayer molded article having the laminated skin material thereon. Since a tension is applied on the skin material so that the skin material is cut by the pin from the pin position towards the center of the mold, an amount of the skin material which slides in the mold can be controlled by adjusting the diameter of each pin and a density of the pins so as to partly adjust a holding force of the skin material. When all the pins have the same diameter, at a part where the pin density is large, the holding force of the skin material is large so that the slid-in amount of the skin material is small, while at a part where the pin density is small, the holding force of the skin material is small so that the slid-in amount of the skin material is large.

For example, when the skin material is laminated all over a surface of a box-shape article, a part of the skin material at each corner tends to be wrinkled. To prevent such wrinkle at the corners, a larger number of the pins are provided at such parts to increase the holding force. If the skin material is torn or stretched excessively, the skin material is mounted on the pins in a slightly slackened state.

The pin with a large diameter provides a larger holding force than the pin with a small diameter, so that the slid-in amount of the skin material is reduced. Therefore, the slid-in amount of the skin material can be adjusted also by changing the pin diameter.

Since a part of the skin material held on the pin tends to be cut in the direction towards the center of the mold, each pin is preferably positioned outwardly apart from the mold part corresponding to the article edge by at least 10 mm. To enhance workability when setting the skin material on the skin material-fixing frame and durability of the pins, a diameter of each pin is preferably from 3 mm to 6 mm.

The melt of the thermoplastic resin of the core layer may be supplied from a resin supplying apparatus which is provided outside the molds or through a conduit provided in either of the upper and lower molds. Preferably, a mold closing rate is adjusted at 30 mm/sec. or less, and the thermoplastic resin melt is supplied when a clearance between the upper and lower molds is from (C+5) mm to (C+100) mm wherein C is a clearance when the molding is finished. After the resin melt is supplied, the molds are further closed to the clearance of C mm, pressed for a predetermined time and cooled to obtain the desired multi-layer molded article.

PREFERRED EMBODIMENTS OF THE INVENTION

The present invention will be illustrated by the following Examples.

EXAMPLE 1

Figure 1B:
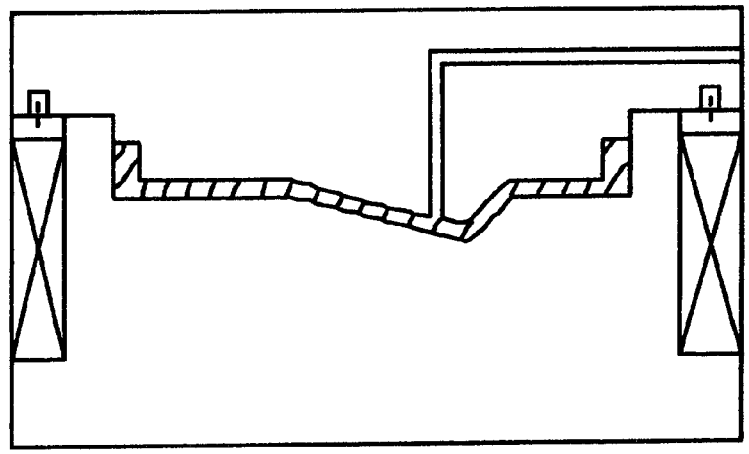
Figure 2:
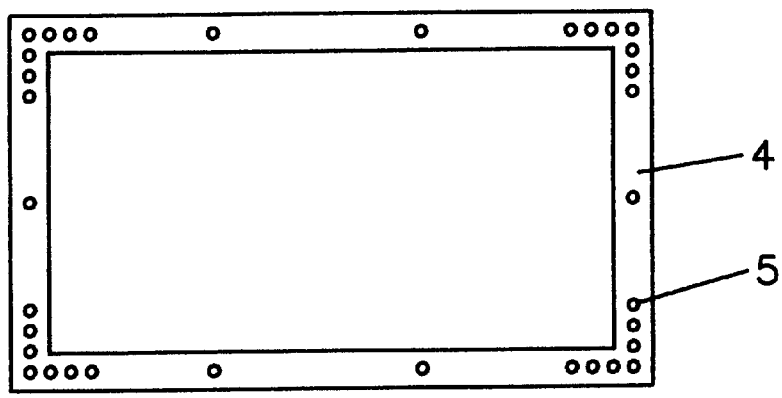
FIG. 2 is a plane view of an example of the skin material-fixing frame having pins according to the present invention.
Figure 3:
FIG. 3 is a perspective view of an example of the multilayer molded article produced by the process of the present invention.

To a pressing machine having a clamping force of 400 tons, a pair of molds which form an article as shown in FIG. 3 were attached. The molds and the skin material-fixing frame were arranged as shown in FIGS. 1A and 1B. As shown in FIG. 2, the skin material-fixing frame 4 had, on its upper surface, pins 5 each having a diameter of 5 mm and a length of 20 mm at a distance of 230 mm on each side and at a distance of 50 mm on each corner.

As a skin material, an embossed polyvinyl chloride sheet lined with an expandable fabric having a total thickness of 0.7 mm (manufactured by Kyowa Leather Co., Ltd.) was used. As a thermoplastic resin, polypropylene containing 15% of talc (Sumitomo Noblen BPZ 5077 manufactured by Sumitomo Chemical Co., Ltd.; Melt flow index of 40 g/10 min.) was used. The upper and lower molds were maintained at 50° C. and 60° C., respectively.

The skin material 7 was held on the skin material-fixing frame 4 by piercing the skin material 7 with the pins 5. The lower mold 2 was lifted up so as to contact the skin material-fixing frame 4 and the upper mold 1 through the skin material 7. When the lower mold was further lifted up, expansion means 6 was compressed by the lifting force of the lower mold so that the outer side wall of the upper mold 1 and the inner side wall of the lower mold 2 mated each other through the skin material 7 to form a closed cavity.

The lower mold was further lifted up. When the cavity clearance reached 50 mm, the lifting speed of the lower mold was decreased to 7 mm/min. and a thermoplastic resin which had been heated and molten at 220° C. was supplied between the skin material and the upper mold through a resin conduit 3 provided in the upper mold (FIG. 1A). The resin supply was stopped when the clearance reached 20 mm.

When the lower mold 2 was further lifted up, the molten resin was compressed and flowed while pressing the skin material 7 to the lower mold wall and expanding the skin material 7 to fill the mold cavity (FIG. 1B).

When the clearance reached 3.1 mm, the skin material-fixing frame 4 contacted a horizontal part of the upper mold 1 and then the lifting up of the lower mold 2 was stopped. In this state, the molds were pressed and cooled for 40 seconds, and the lower mold 2 was lowered. Thereafter, the molded article was removed from the mold. The article consisted of the core layer having a thickness of 2.5 mm covered with the embossed skin material having no wrinkle or breakage.

EXAMPLE 2

Figure 5:
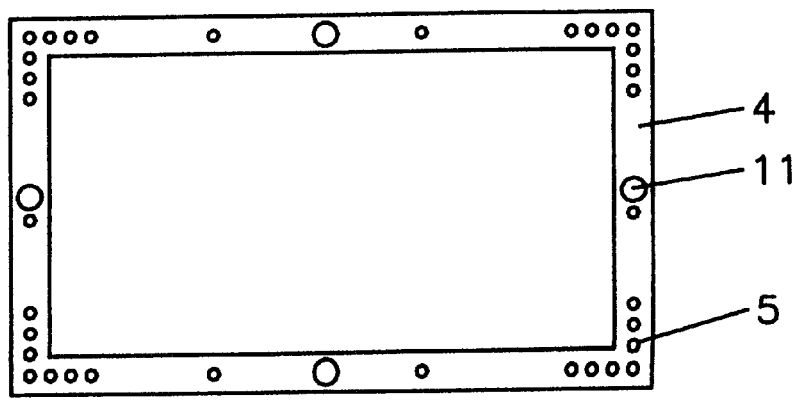
FIG. 5 is a plane view of another example of the skin material-fixing frame having pins according to the present invention.
Figure 4A:
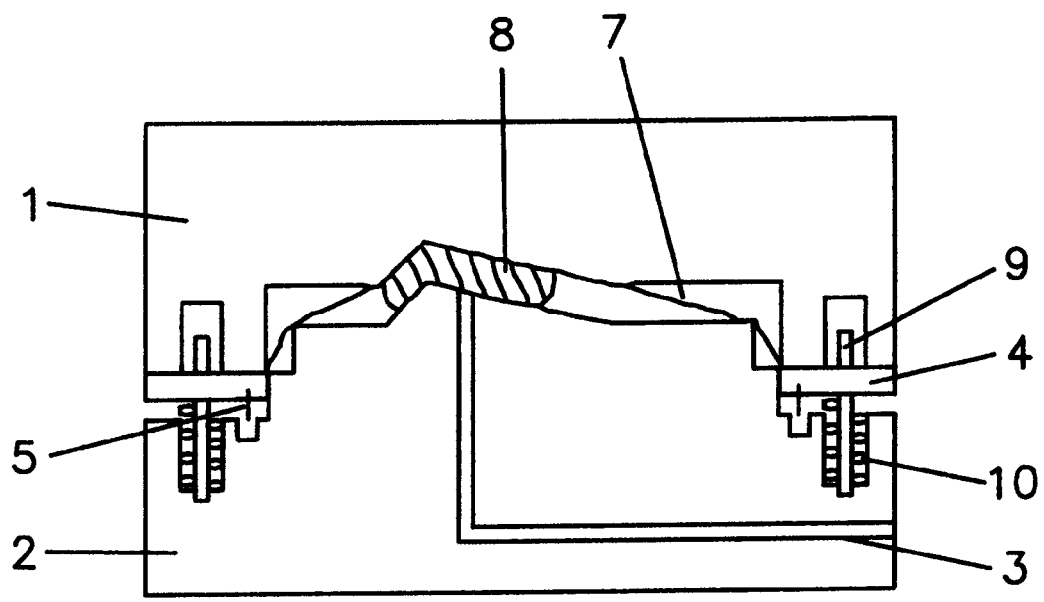
FIGS. 4A and 4B are vertical cross sectional views of another example of the molds used in the molding process of the present invention.
Figure 4B:
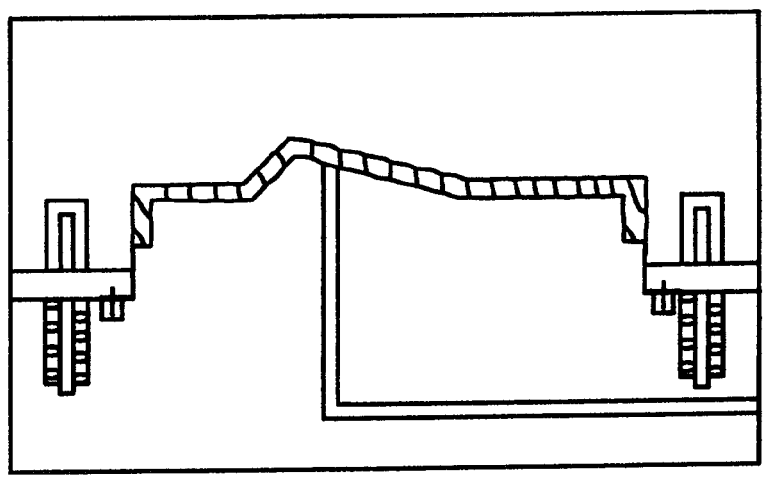

To a pressing machine having a clamping force of 400 tons, a pair as shown in of molds which mold an article as shown in FIG. 3 were attached. The molds and the skin material-fixing frame were arranged as shown in FIGS. 4A and 4B. As shown in FIG. 5, the skin material-fixing frame 4 had, on its upper surface, pins 5 each having a diameter of 5 mm and a length of 20 mm at a distance of 230 mm on each side and at a distance of 50 mm on each corner. At a center of each side, a bar-passing hole 11 was formed.

As a skin material, an embossed polyvinyl chloride sheet having a thickness of 0.5 mm lined with a polypropylene foam sheet having a thickness of 3.0 mm (manufactured by Toray, an expansion ratio of 15) was used. As a thermoplastic resin, polypropylene containing 15% of talc (Sumitomo Noblen BPZ 5077 manufactured by Sumitomo Chemical Co., Ltd.; Melt flow index of 40 g/10 min.) was used. The upper and lower molds were maintained at 20° C. and 30° C., respectively.

The skin material 7 was held on the skin material-fixing frame 4 by piercing the skin material 7 with the pins 5. The upper mold 1 was lowered so as to contact the skin material-fixing frame 4 and the upper mold 1 through the skin material 7. When the upper mold was further lowered, expansion means 6 was compressed by the lowering force of the upper mold so that the outer side wall of the upper mold 1 and the inner side wall of the lower mold 2 mated each other through the skin material 7 to form a closed cavity.

The upper mold 1 was further lowered. When the cavity clearance reached 50 mm, the lowering speed of the upper mold was decreased to 7 mm/min. and a thermoplastic resin which had been heated and molten at 190° C. was supplied between the skin material and the lower mold through a resin conduit 3 provided in the lower mold (FIG. 4A). The resin supply was stopped when the clearance reached 20 mm.

When the upper mold 1 was further lowered, the molten resin was compressed and flowed while pressing the skin material 7 to the upper mold wall and expanding the skin material 7 to fill the mold cavity (FIG. 4B).

When the clearance reached 2.7 mm, the skin material-fixing frame 4 contacted a horizontal part of the lower mold 2 and then the lowering of the lower mold 2 was stopped. In this state, the molds were pressed and cooled for 40 seconds, and the upper mold 1 was lifted up. Thereafter, the molded article was removed from the mold. The article consisted of the core layer having a thickness of 2.0 mm covered with the embossed skin material having no wrinkle or breakage.

What is claimed is:

1. A process for producing a multilayer molded article comprising a core layer and a skin material laminated thereon, which process comprises the steps of:

mounting a skin material between a pair of upper and lower molds by fixing an edge portion of said skin material to a plurality of prepositioned pins provided on a skin material fixing frame;

supplying a thermoplastic resin melt between said skin material and one of said molds;

closing the molds to press and form said resin melt while simultaneously moving said skin material fixing frame along an outer peripheral wall of one of said upper and lower molds, to thereby hold the edge portion of said skin material such that said edge portion of said skin material is locally cut at one or more of said pins according to a shape of the molded article and a tension at any one of said pins during said step of closing; and cooling said molds and removing said multilayer molded article from the molds.

2. The process according to claim 1, wherein each of said pins has a diameter of 3 to 6 mm and protrudes in a length of about 20 mm from a surface of said skin material-fixing frame.

3. The process according to claim 1, wherein said skin has holes at positions corresponding to positions of said pins and said pins are passed through the respective holes to set said skin material on said skin material-fixing frame.

4. The process according to claim 1, wherein each of said pins is positioned outwardly apart from the mold part corresponding to the article edge by at least 10 mm.

5. In a process for producing a multilayered molded article which includes the steps of mounting a skin material between upper and lower molds by fixing an edge portion thereof to holding pins, supplying thermoplastic resin melt between said skin material and one of said molds, and closing the molds so as to form a laminated molded article, the improvement which comprises:

controlling the tension of said skin material during said mold closing step by preselecting the location and diameter of the holding pins such that said edge portion is controllably, locally cut by at least one of said pins, thereby appropriately controlling the tension of the skin material and reducing the occurrence of skin wrinkling and breakage in the molded article;

wherein said molded article does not contain the edge portion of the skin material.

6. The process according to claim 5, wherein said pins are provided on a skin material fixing frame that moves along an outer peripheral wall of one of said molds during said mold closing step.

* * * * *